(12) United States Patent
Oishi et al.

(10) Patent No.: US 7,107,458 B2
(45) Date of Patent: Sep. 12, 2006

(54) AUTHENTICATION COMMUNICATING SEMICONDUCTOR DEVICE

(75) Inventors: Toshihisa Oishi, Urawa (JP); Jun Tozawa, Yokohama (JP); Tetsuya Shibayama, Kodaira (JP); Masato Hamada, Nishitokyo (JP)

(73) Assignee: Renesas Technology Corp., Tokyo (JP)

( * ) Notice: Subject to any disclaimer, the term of this patent is extended or adjusted under 35 U.S.C. 154(b) by 824 days.

(21) Appl. No.: 09/864,304

(22) Filed: May 25, 2001

(65) Prior Publication Data

US 2001/0052070 A1 Dec. 13, 2001

(30) Foreign Application Priority Data

May 29, 2000 (JP) .............................. 2000-158770

(51) Int. Cl.
*H04L 9/32* (2006.01)

(52) U.S. Cl. ........................ 713/189; 713/192; 713/194

(58) Field of Classification Search ................ 713/151, 713/189, 172–174, 159, 168, 192, 194; 380/30, 380/44; 708/491; 235/375, 380, 487, 492
See application file for complete search history.

(56) References Cited

U.S. PATENT DOCUMENTS 6,101,255 A 8/2000 Harrison et al.
6,343,281 B1 1/2002 Kato 6,466,668 B1 * 10/2002 Miyazaki et al. ............. 380/30

FOREIGN PATENT DOCUMENTS

JP A 07 50663 2/1995

OTHER PUBLICATIONS

"5C Digital Transmission Content Protection White Paper", Rev. 1.0, Jul. 14, 1998.

* cited by examiner

*Primary Examiner*—Hosuk Song
(74) *Attorney, Agent, or Firm*—Mattingly, Stanger, Malur & Brundidge, P.C.

(57) ABSTRACT

In an authentication communicating semiconductor device to enhance protection against illegal copying, a logic analyzer probe or the like is connected to a CPU bus to suppress possibility in which the authentication process is intercepted and is analyzed to break the mechanism of illegal copy protection and the electronic device is modified to set a tampered encryption key to the CPU bus. The authentication communicating semiconductor device includes a semiconductor chip, a main processing unit formed on the chip for generating a key code according to a predetermined algorithm, for determining approval/non-approval of communication of data with an external device, and for controlling the communication; an encryption unit formed on the chip for encrypting and decoding communication data using the key code generated by the main processing unit, and an interface unit formed on the chip for conducting communication with an upper-layer or a lower-layer according to a predetermined protocol.

11 Claims, 13 Drawing Sheets

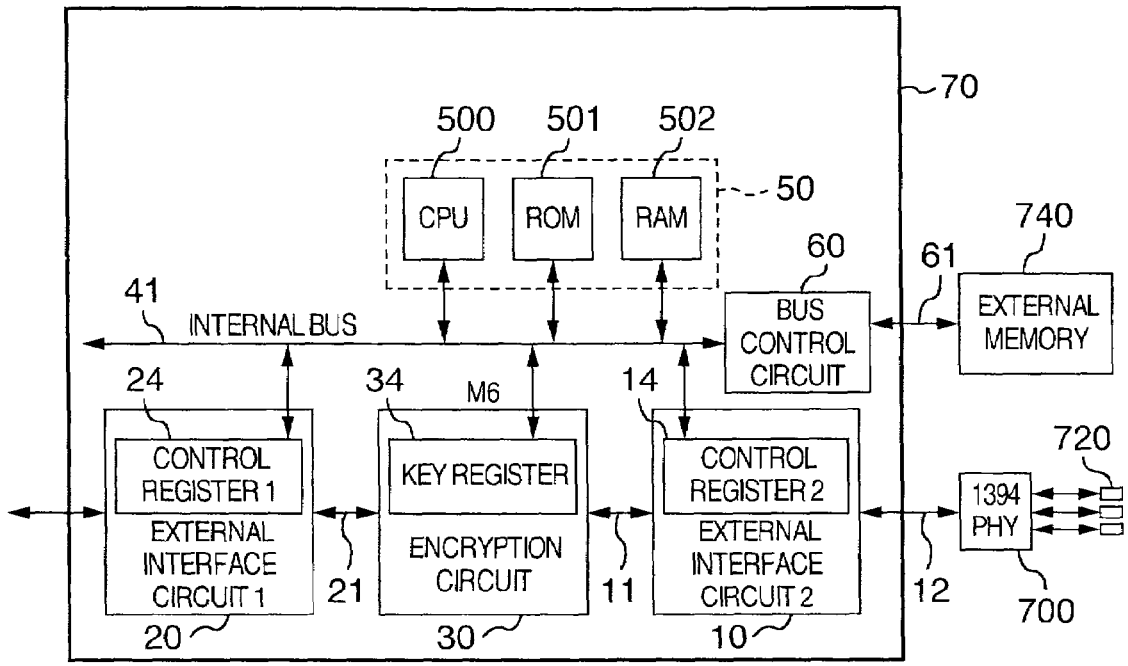
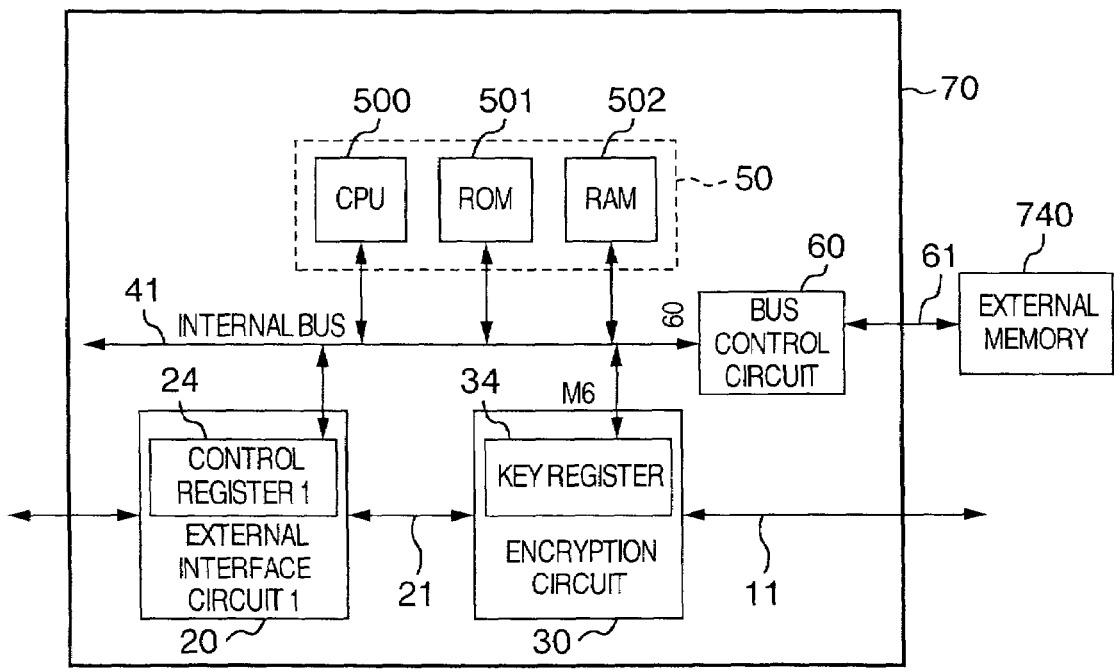

AUTHENTICATION COMMUNICATING SEMICONDUCTOR DEVICE

BACKGROUND OF THE INVENTION

The present invention relates to a data processing technique and a technique suitably applicable to processing to code and to decode digital data using an encryption key code, for example, to a technique efficiently applicable to a communicating semiconductor device and a system using the device in which data is communicated between electronic apparatuses connected to each other via a serial bus conforming to, for example, the standard of Institute of Electrical and Electronics Engineers 1394 (IEEE1394) while guaranteeing safety of the communication.

The IEEE1394 standard is a standard to serially transmit digital data of audio and video information between electronic apparatuses such as audiovisual (AV) apparatuses via a cable. Recently, there have been proposed electronic apparatuses in which electronic apparatuses such as an integrated receiver decoder (IRD), a digital video home system (D-VHS), and a digital video (DV) camera recorder (camcoder) are connected to each other via a serial bus of the IEEE1394 standard to communicate digital contents including, for example, digital audio data and/or digital video data therebetween using a packet conforming to, for example, the Moving Picture Experts Group 2 Transport Stream (MPEG2-TS) according to the International standardization Organization/International Electrotechnical Commission (ISO/IEC) 13813 standard and a packet conforming to the IEC61883 standard.

For media such as a digital video tape and a digital video disk to store copyrighted materials such as a film and reproducing apparatuses to reproduce the materials, a technique to prevent illegal copying of the copyrighted material is indispensable in consideration of protection of copyrights. Recently, to protect copyrights of digital contents, an illegal copy prevention technique is being standardized, for example, by a copy protection technical working group (CPTWG) organized by industrial groups organized by the industry for the electric appliance for family use, personal computers, and films. According to an illegal copy protection technique proposed primarily by CPTWG, a specification of content scrambling system (CSS) of DVD video and a specification of 5 company digital transmission content protection (5C-DTCP) for IEEE1394 have been put to practices at present.

However, against CSS of the DVD-video copy protection technique, some crackers, i.e., hackers who illegally access computer systems of other person for malicious purposes have already created software to circumvent or to break security provided by CSS. In the U.S.A. and France, the software has been delivered via the internet through worldwide web (www) servers and has caused damages in various fields of the industry.

Therefore, in a situation in which a large amount of audiovisual apparatuses using an identical security technique such as the standardized CSS or 5C-DTCP are widely spread in the world, highly reliable security is necessary for the audiovisual apparatuses against illegal copy by crackers in consideration of the protection of copyrights for digital contents.

As a vicious example of the illegal copying of copyrighted materials, an illegal or an authorized game machine has been put to market. The illegal game machine is implemented by illegally modifying hardware of a game machine of a known company to enable the illegal copying of game software stored on a compact disk (CD). The copyright of the game software has been infringed. As above, in the present stage of technique, there possibly occurs software wise and hardware wise attack, that is, not only the illegal copy by software but also the illegal copy by modified hardware of electronic apparatuses are used to attack the illegal copy protection technique.

On the other hand, 5C-DTCP has been practically applied to a system below. FIG. 13 shows a general configuration of an audiovisual apparatus as an authentication communicating apparatus of the 5C-DTCP specification and a system using the apparatus according to the prior art. The configuration of FIG. 13 includes a communicating semiconductor device (communicating apparatus) 72 of the 5C-DTCP specification and an authentication device 71 including a microcomputer chip to conduct authentication. The authentication device 71 and the communicating device 72 are mounted on audiovisual apparatuses such as a digital video tape recorder and a set-top box.

As shown in FIG. 13, the communicating device 72 includes a low-layer interface circuit 100 to establish connections to IEEE1394 serial buses 741 to 743, an upper-layer interface circuit 200 to establish a connection to an external device, and an encryption circuit 300. The communicating device 72 is connected between a 1394 physical (PHY) layer as a physical layer including ports 711 to 713 to establish connections to cables 730 of the IEEE1394 standard and an external device 90 such as a display including an MPEG2 decoder, a codec, or a DV codec. The communication device 72 has a function which receives encrypted digital data from the IEEE1394 cable 730 to decode the digital data to pass the decoded digital data to the external device 80. The low-layer interface circuit 100, the upper-layer interface circuit 200, and the encryption circuit 300 may be configured as respectively separate chips depending on cases. The authentication device 71 is connected via an internal bus 41 to the communicating device 72. The authentication device 71 has a function to generate an encryption key code (to be simply referred to as an encryption key herebelow) necessary for the encryption circuit 300 and a function to conduct authentication in response to a request from an audiovisual apparatus which desires to receive data.

SUMMARY OF THE INVENTION

However, in the system of the 5C-DTPC specification (authentication communicating apparatus) of the prior art, the communicating device 71 and the authentication device 72 are configured as respectively separate chips and hence the communicating device 71 is connected via the bus to the authenticating device 71, a random access memory (RAM) 750, and an electrically rewritable flash read-only memory (ROM). The interface circuits 100 and 200 in the communicating device 72 include control registers 14 and 24, respectively. The encryption circuit 300 includes a key register 34. Control data and a coding/decoding encryption key code are set via the registers 14, 24, and 34 to the authentication device 71 to conduct operations such as the coding or encryption and the decoding operation.

Consequently, in the authentication communicating apparatus of 5C-DTCP specification of the prior art, there exists a disadvantage. That is, by monitoring a signal at an external terminal 62 at which the encryption circuit 300 is connected to the bus 41, secret items are known to a third person, for example, an encryption key is known to the third person and an encryption algorithm is analyzed by the third person.

Specifically, in the configuration of an audiovisual apparatus shown in FIG. 10, there exists a chance for the third person to make an attack against to the system, for example, to access the secret items of the authenticating device. That is, the third person accesses the system by monitoring the signal at the external terminal 62 of the communicating device 72 and data on the central processing unit (CPU) bus 41 to illegally obtain communication commands, an encryption exchange key, and a random number value for the operation of authentication. This may deteriorate reliability of security of this system.

Assume that an illegal device is produced as a result of the attack to pass the authentication in an illegal way. For example, as shown in FIG. 14, when an illegal device 75 is connected to the CPU bus 41 and the authentication device 71 in each of audiovisual apparatuses 800A and 800B and a connection line such as a jumper wire 46 is disposed between the respective CPU buses 41. As a result of this illegal modification, communication commands for the authentication are issued from the illegal device 75 to the authentication device 71 associated therewith to form an illegally pass to detour round the legitimate authentication. Consequently, the authentication is granted or satisfied in an illegal way. Thereafter, in a stage to code/decode the pertinent digital content in the encryption circuit, the illegal device 75 issues a bus right request signal to the associated authentication device 71 to acquire the bus right of the CPU bus 41. After the illegal device 75 obtains the bus right of the CPU bus 41 from the authentication device 71, the illegal device 75 uses an illegal key, which is shared between the illegal devices 75, in place of an encryption key to be used after the authentication is legitimately approved. This leads to a problem of possibility that the digital content is illegally sent from the audiovisual apparatus 800A to the audiovisual apparatus 800B.

It is therefore an object of the present invention to provide an authentication communicating apparatus in which an encryption key and control data of the system cannot be obtained even by the monitoring of the external terminal. This prevents a cracker aiming at illegal accesses to the system from analyzing such information as the encryption key and control data and hence from attacking the illegal copy protection technique to protect copyrights of digital contents. The authentication communicating apparatus thereby prevents the illegal copy of digital contents.

Another object of the present invention is to provide an authentication communicating apparatus in which the illegal copy protection technique withstands any attack using the modification of hardware.

The other objects, novel features, and advantages of the present invention will be more apparent from the following detailed description taken in conjunction with the accompanying drawings.

In accordance with the present invention, there are provided representative aspects of embodying the invention as follows.

To achieve the objects, according to one aspect of the present invention, there is provided an authentication communicating semiconductor device comprising a semiconductor chip, a main processing unit formed on the semiconductor chip for generating a key code according to a predetermined algorithm, for determining approval/non-approval of communication of data with an external device, and for controlling the communication; an encryption unit formed on the semiconductor chip for encrypting and decoding communication data using the key code generated by the main processing unit, and an interface unit formed on the semiconductor chip for conducting communication with an upper layer or a lower layer according to a predetermined protocol.

More specifically, according to another aspect of the present invention, there is provided an authentication communicating semiconductor device comprising a single semiconductor chip, an encryption unit formed on the single semiconductor chip for encrypting, in an encrypting mode, ordinary or non-encrypted statement data into encrypted statement data; for decoding, in a decoding mode, the encrypted statement data into ordinary statement data; and for directly passing data therethrough when neither encryption nor decoding is required. To the device, there are also connected a lower-layer interface unit formed on the single semiconductor chip for the encrypted statement data of the encryption unit for controlling a protocol of communication with a lower layer and an upper-layer interface unit formed on the single semiconductor chip for the ordinary statement data of the encryption unit for controlling a protocol of communication with an upper layer. The lower-layer interface unit comprises at least one lower-layer communication path for communicating encrypted statement data with a lower-layer device controlling a communication signal outside the semiconductor chip. The upper-layer interface unit comprises at least one upper-layer communication path for communicating ordinary statement data with an upper-layer device outside the semiconductor chip. The device also includes a key generation unit formed on the single semiconductor chip for executing authentication processing of communication passing through the lower layer and for executing key generation processing for the encryption unit. The key generation unit comprises a CPU, an ROM, and an RAM. The CPU sets a key register for the encryption unit to keep an encryption key, a control register of the lower-layer interface unit, and a control register of the upper-layer interface unit via a bus connecting the CPU, the encryption unit, the lower-layer interface unit, and the upper-layer interface unit to each other.

In the configuration above, it is difficult to externally obtain or steal internal signals of the semiconductor chip and a communication command for the authentication process, and an encryption key for the encryption process cannot be tampered to be externally inputted to the authentication communicating device configured in a large scale integration (LSI) chip. It is therefore difficult for the third person to analyze the authentication process to circumvent the illegal copy (unauthorized copying) protection technique. This also makes it difficult to circumvent the illegal copy protection technique by modifying an electronic apparatus. In consequence, there can be implemented an electronic apparatus capable of communicating digital contents requiring copyright protection in quite a safe environment.

Furthermore, when an electrically rewritable nonvolatile memory is necessary to store inherent information of an electronic device on which the pertinent semiconductor device is mounted, the memory is also formed on the pertinent same chip. This prevents the inherent information of the electronic device from being intercepted or stolen by a third person. Since the electrically rewritable nonvolatile memory is employed, security can be improved at a low cost by writing mutually different inherent information items for the respective devices. The information items can be written in the electrically rewritable nonvolatile memory before the installation of the memory in the system.

Additionally, the main processing unit which generates a key code, which authenticates an external device, and which controls communication; the encryption unit, and the interface unit are mutually connected via an internal bus. When an electrically rewritable nonvolatile memory is necessary to store inherent information of an electronic device on which the pertinent semiconductor device is mounted, a bus control circuit is disposed between an external terminal connected to the nonvolatile memory and the internal bus to control a bus change-over operation. Therefore, the encryption process and the authentication process cannot be externally intercepted. This also makes it difficult for a third person external with respect to the chip to tamper an encryption key used in the encryption process and a communication control code used in the authentication process. Therefore, neither the encryption key nor the communication control code can be easily inputted to the system in the illegal way. Attack from crackers such as analysis of the encryption and authentication and modification of devices can be resultantly prevented. This improves safety against the illegal copy of digital contents for which the copyright protection is required.

Moreover, there is further required a host CPU to control the overall system of the electronic apparatus on which the semiconductor device is mounted. The main processing unit of the semiconductor device includes a nonvolatile memory having stored therein a program implementing a key generation algorithm and an authentication algorithm to authenticate an external device requesting data communication and program-execution-type control means for generating a key code and for determining approval/non-approval of communication of data with an external device according to the program. In this configuration, there is provided a communication circuit for communication between the control means and the host CPU between a communication port of the host CPU and the internal bus. As a result, this prevents, in a semiconductor device having a communication port to the host CPU, the encryption process and the authentication process from being externally intercepted via the communication port. This also makes it difficult for a third person to externally tamper an encryption key in the encryption process and a communication control code in the authentication process. Therefore, neither the encryption key nor the communication control code can be easily inputted to the system in the illegal way. Attack from crackers such as analysis of the encryption and authentication and modification of devices can be resultantly prevented.

In this case, the control unit is so configured to accept only restricted and predetermined commands. This prevents illegal intervention in the encryption process and the authentication process and hence improves safety of the system.

BRIEF DESCRIPTION OF THE DRAWINGS

FIG. 10 is a block diagram showing a variation of the embodiment shown in FIG. 9.

FIG. 11 is a block diagram showing another variation of the embodiment shown in FIG. 9.

DETAILED DESCRIPTION OF THE EMBODIMENTS

Figure 1:
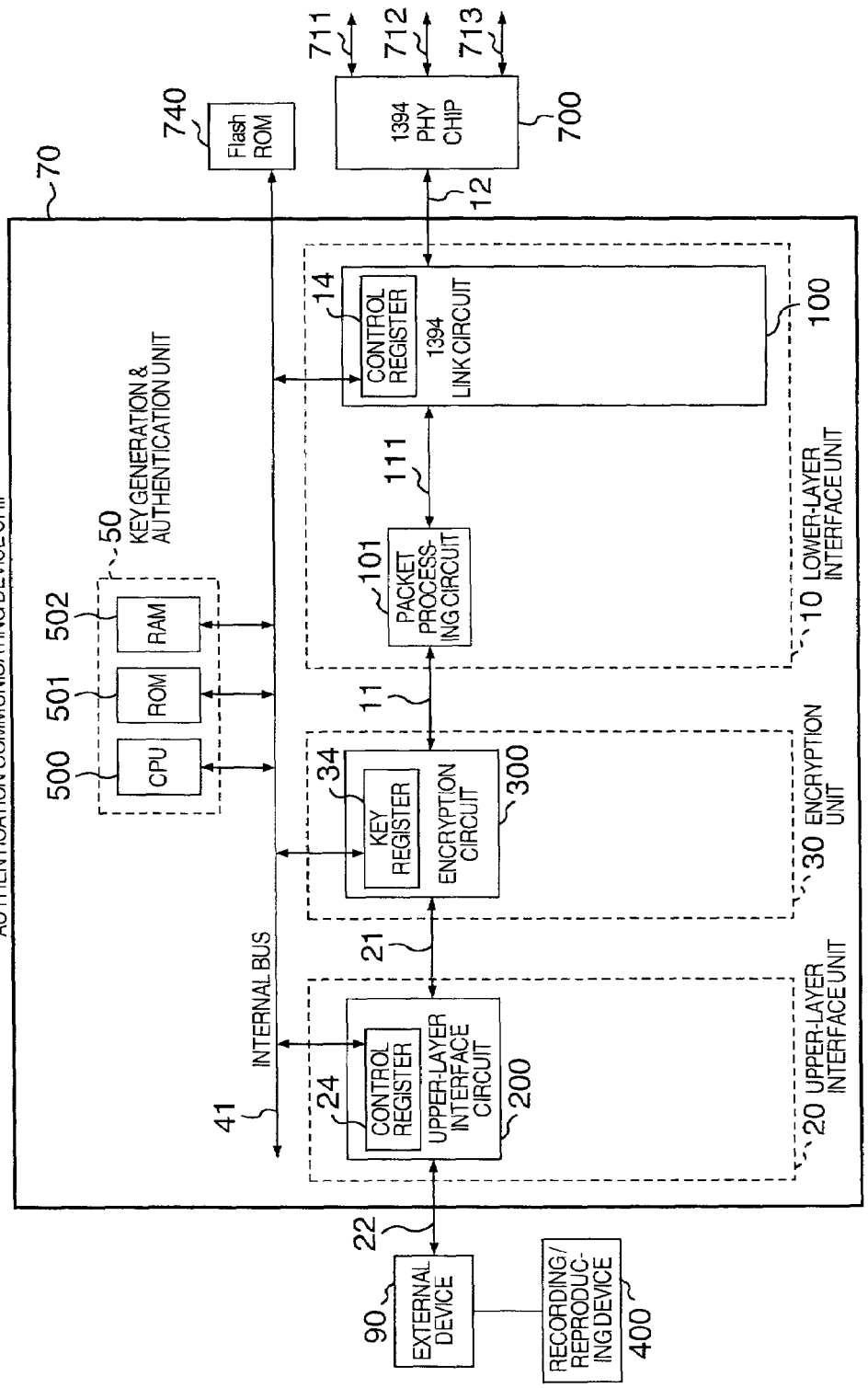
FIG. 1 is a block diagram showing a first embodiment including an authentication communicating LSI unit according to the present invention and an audiovisual apparatus including the same.

Description will now be given of embodiments of the present invention by referring to the drawings.

FIG. 1 shows a first embodiment of an authentication communicating LSI circuit of the 5C-DTCP specification according to the present invention.

In this embodiment of an authentication communicating LSI circuit, a key generation & authentication unit 50 which includes a CPU 500, an RAM 502 to provide a work are, and an ROM 501 to store programs and fixed data and which has functions such as a function to generate an encryption key and a function to conduct the authentication to determine approval/non-approval of communication of data to and from an external device, and a function to control communication; a lower-layer interface unit 10 to establish connection to an IEEE1394 serial bus, an upper-layer interface unit 20 to establish connection to an external device, an encryption unit 30 to execute encryption and decoding of data using an encryption key, and an internal bus 41 to connect the constituent units to each other are formed on one semiconductor chip such as a monocrystalline silicon chip.

The inner bus 41 is connected to an external nonvolatile memory 740 such as an electrically rewritable flash memory to store data and information, for example, a communication control program to set a communication route and inherent information of devices. The lower-layer interface unit 10 is connected to an IEEE1394 physical layer protocol (1394PHY) chip 700 as a physical layer including ports 711 to 713 to be connected respectively to IEEE1394 cables 730 (which will be described later) of the IEEE1394 standard and the upper-layer interface unit 20 is connected to an external device 90 such as an MPEG2 decoder, a codec, or a DV codec and the external device 90 is connected to a recording and reproducing unit 400. This resultantly configures an audiovisual apparatus.

The lower-layer interface unit 10 includes a packet processing circuit 101 to process data for communication thereof in a packet format and a 1394 link circuit 100 as a link layer connected via a lower-layer bus 12 to the 1394PHY chip 700 to control connection to the IEEE1394 cables 730. The 1394PHY chip 700 is a semiconductor chip to conduct a control operation as a physical layer such as multiplexing and demultiplexing of data. The chip 700 includes, although not limited to, three ports 711, 712, and 713 of the IEEE1394 specification. Specific connection between the ports 711 to 713 and the IEEE1394 cables (to be simply referred to as 1394 cables herebelow) 730 is the same as for the prior art example shown in FIG. 13. That is, the ports 711, 712, and 713 are respectively connected to sockets 721, 722, and 723 of the IEEE1394 specification of a connector unit 720.

Figure 7:
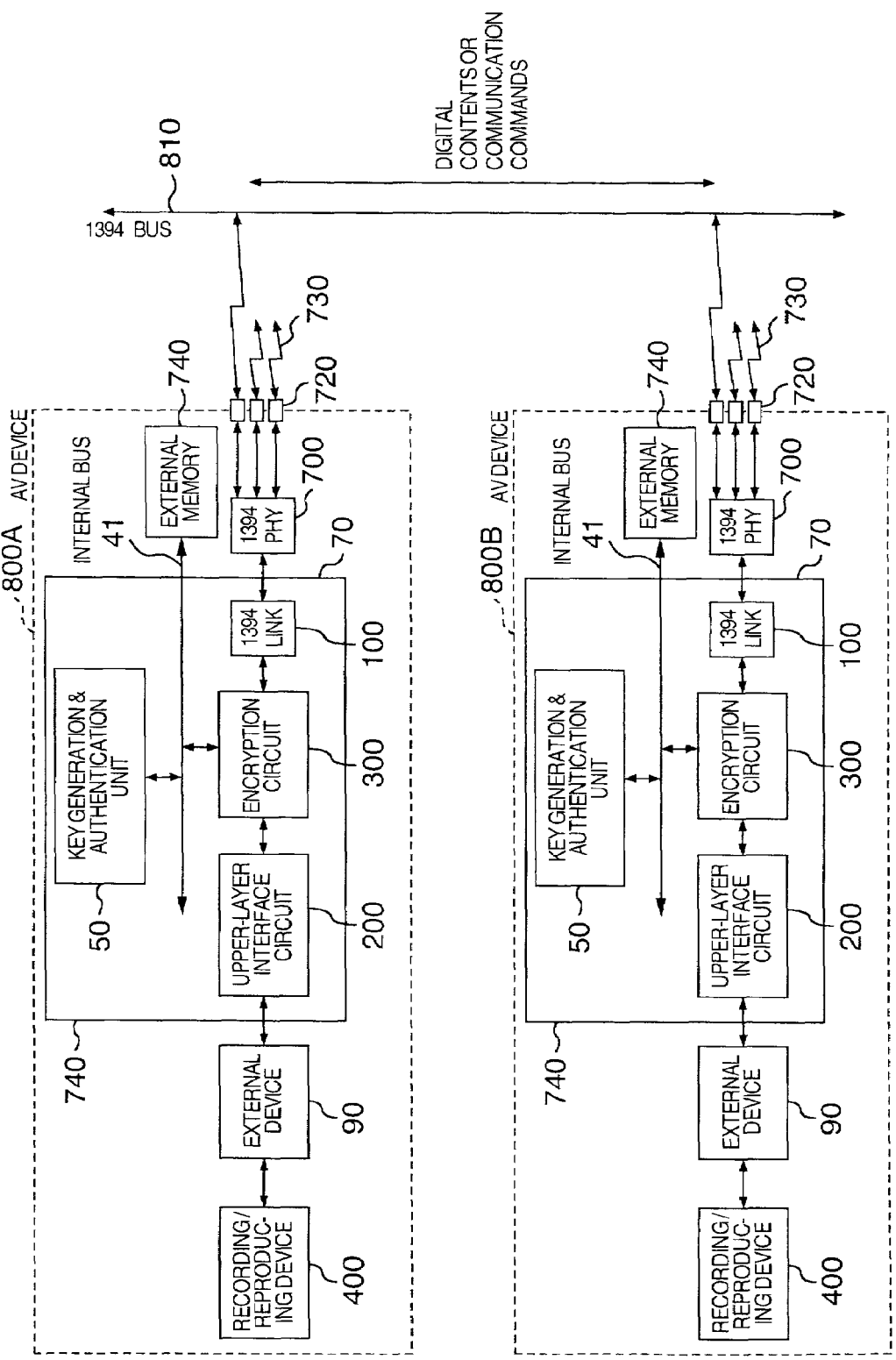
FIG. 7 is a diagram for explaining a configuration including an IEEE1394 serial bus connected two audiovisual apparatuses each configured as shown in FIG. 1.
Figure 13:
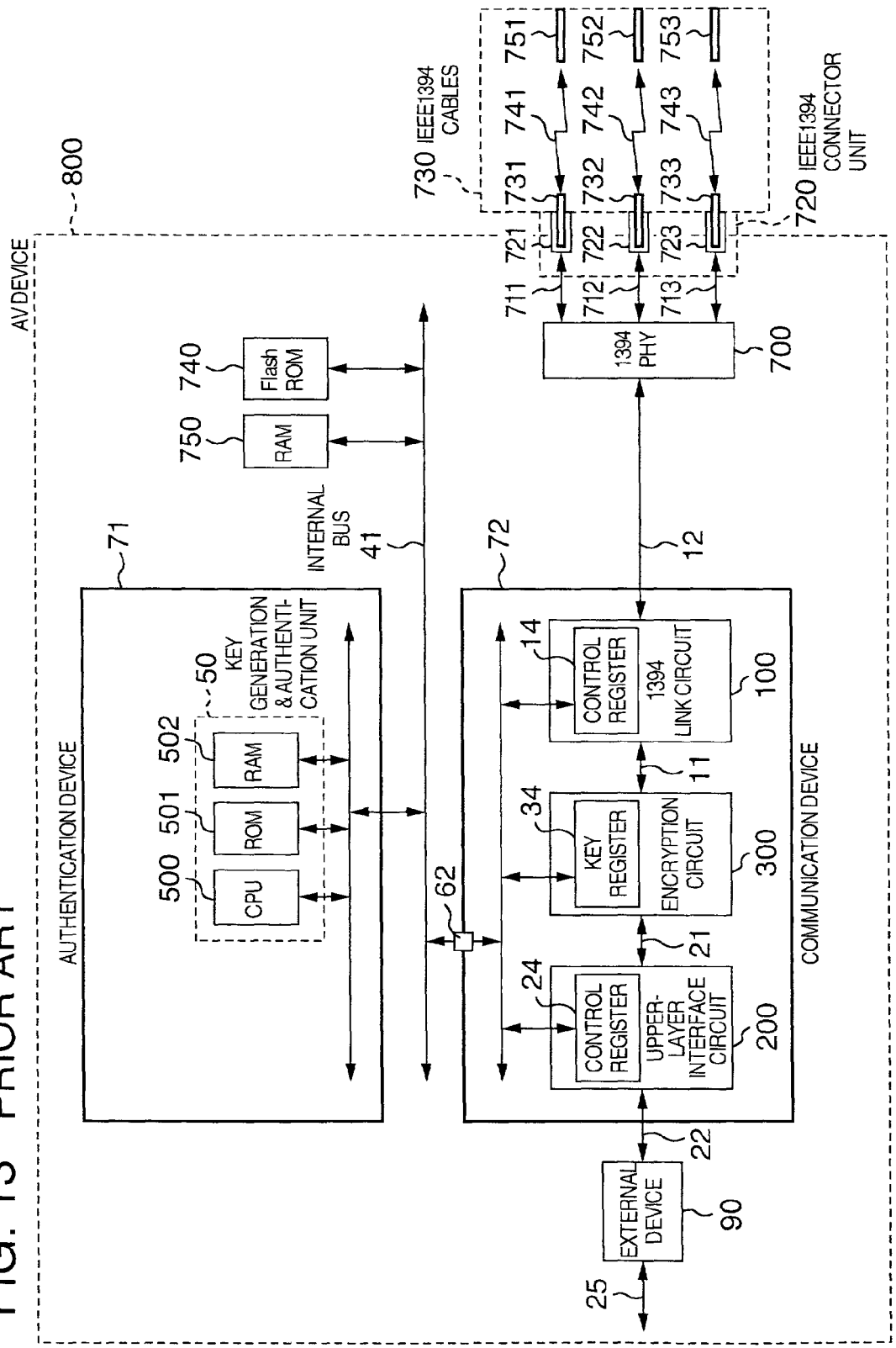
FIG. 13 is a block diagram showing an example of an authentication communicating LSI unit of the prior art and an audiovisual apparatus including the same.
Figure 14:
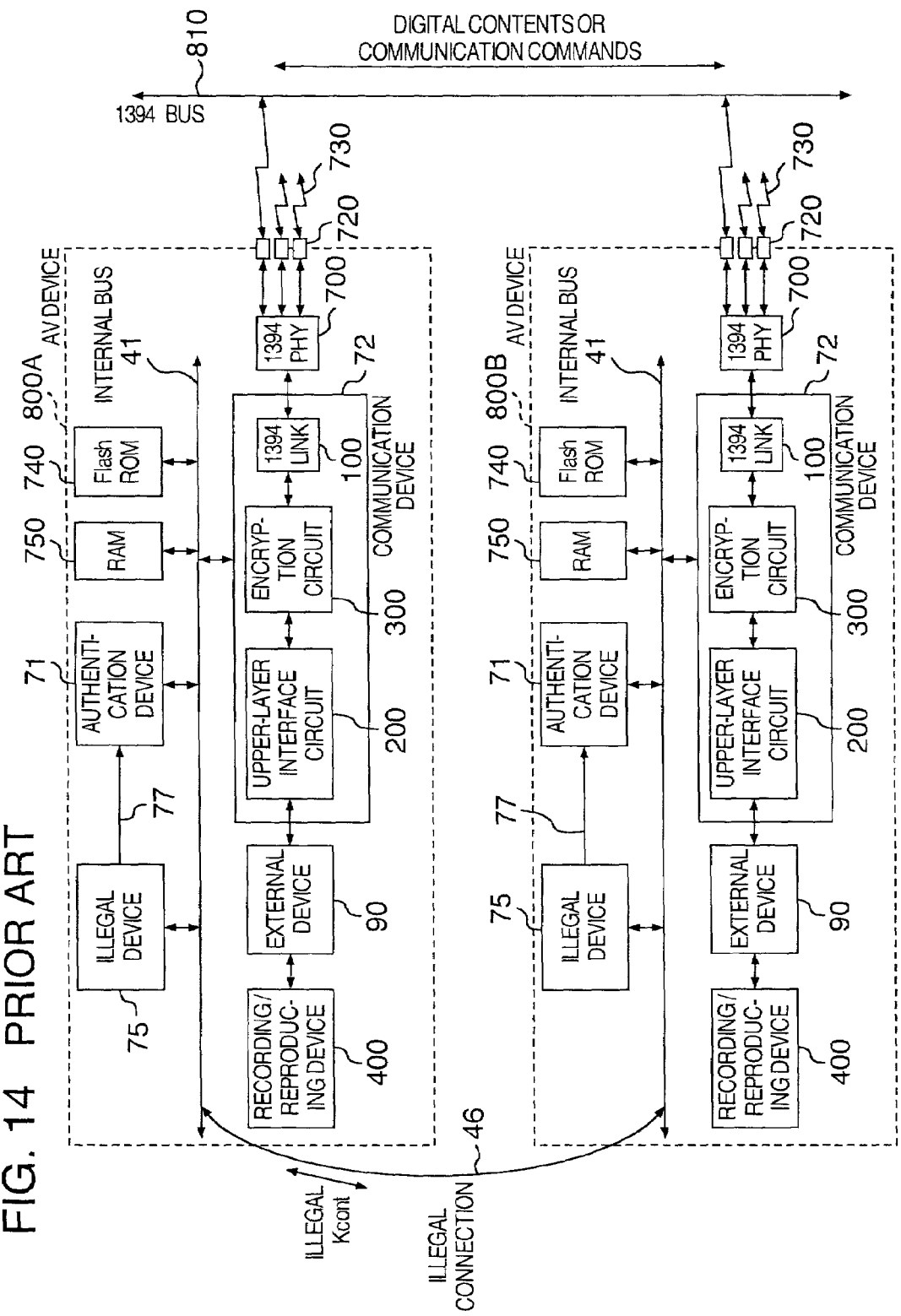
FIG. 14 is a diagram for explaining an illegal modification in an authentication communicating LSI unit of the prior art and an audiovisual apparatus including the same.

Referring to FIG. 13, the user connects a 1394 plug 731 as an end of a 1394 cable 741 to the socket 721 available in the IEEE1394 connector unit 720 and connects a 1394-plug 751 of an end of a non-connection side of the 1394 cable 741 to the IEEE1394 connector unit of the audiovisual apparatus. As a result, the user can reserve a 1394-bus 810 as a transmission path to communicate digital contents and communication commands between the audiovisual apparatuses 800A and 800B as shown in FIG. 7. By removing the plug 731 of the 1394 cable 741, the pertinent audiovisual apparatus can be released from the 1394 bus. For simplification of description, the 1394 bus connection is established between two audiovisual apparatuses in FIG. 7. However, in accordance with the present invention, the number of buses stipulated by the lower-layer communication protocol is not topologically limited to two. That is, other electronic apparatuses can be similarly connected to the 1394 bus 810.

The upper-layer interface circuit 200 is an interface circuit to pass a digital content from a physical layer of the 1394PHY chip 700 and a link layer of the 1394 link circuit 100 to an upper-layer device. The upper-layer interface circuit 200 is connected via an upper-layer bus 22 to the external device 90 such as an MPEG2 codec (coder/decoder) or a DV codec. The external device is connected to the recording and reproducing apparatus 400. The apparatus 400 records or reproduces audio and visual digital contents.

The interface units 10 and 20 respectively include control registers 14 and 24. The CPU 500 of the key generation & authentication unit 50 sets a control code via the internal bus 41 to the control registers 24 and 14 to set communication paths to the 1394 link circuit 100 and the upper-layer interface circuit 200. A lower-layer communication control program is stored in an external memory 740. According to the program, the CPU 500 sets the control register 14 to conduct communication via a lower-layer device to an electronic device on the 1394 bus 810. Specifically, the CPU 500 issues a communication command to an electronic device on the 1394 bus 810 for a desired function. For example, the CPU 500 controls the recording or reproducing operation of the electronic apparatus, the on/off state of its power source, a browsing operation for information of the electronic device.

The encryption key processing unit 30 includes a key register 34. The ROM 501 beforehand stores programs respectively to implement an encryption key generation algorithm and an authentication algorithm. According to the encryption key generation algorithm, the CPU 500 of the key generation & authentication unit 50 generates an encryption key to write the encryption key in the key register 34 of the encryption circuit 300. The CPU 500 conducts authentication according to the authentication algorithm stored in the ROM 501.

Figure 8:
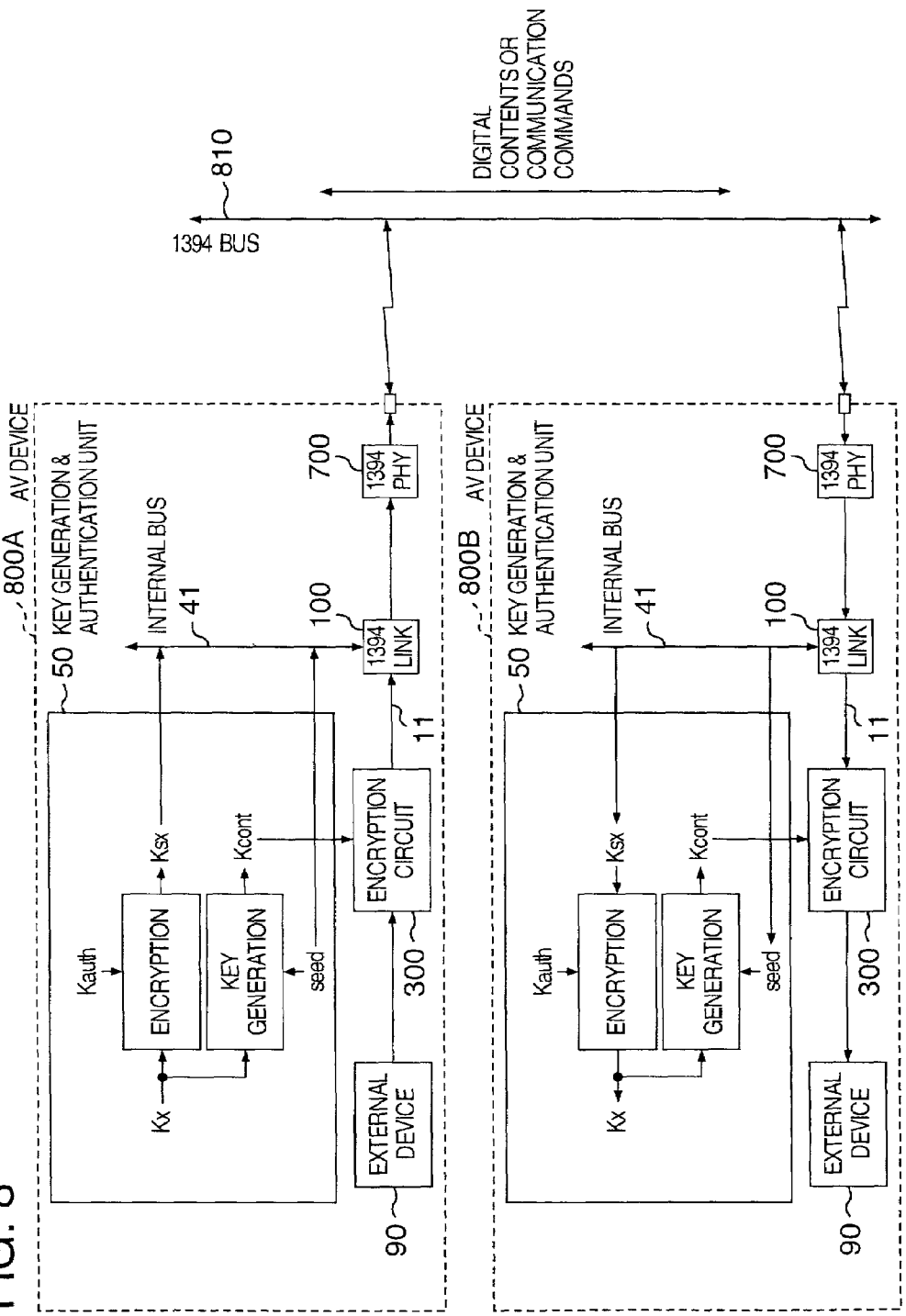
FIG. 8 is a diagram for explaining processes of authentication and encryption in an authentication communicating LSI unit according to the present invention and an audiovisual apparatus including the same.

Referring next to FIG. 8, description will be given in detail of procedures of authentication and encryption between audiovisual apparatuses each of which includes the authentication communicating LSI chip of the embodiment.

To transmit a digital content to be accumulated or sent from the audiovisual device 800A to the recording/reproducing device 400, the audiovisual device 800B which desires to receive an encrypted digital content issues a communication command, i.e., an authentication request command with information of its own machine via the 1394 bus to the audiovisual device 800A to request authentication. Having received the authentication request command, the CPU 500 of the audiovisual device 800A executes an authentication program recorded on the ROM 51 to conduct authentication for the audiovisual machine 800B. If the authentication is approved or satisfied, the pertinent electronic apparatus is recognized as an authorized machine.

After the authentication is successfully finished, the key generation & authentication unit 50 of the audiovisual device 800A (FIG. 8) generates an encryption exchange key Ksx by executing encryption processing to convert an encryption key Kcont of the digital content into an exchange key Kx using a random number value seed and an authentication key Kauth necessary for the audiovisual device 800B to generate the encryption key Kcont. The key Ksx is then sent via the CPU bus 41, the 1394 link circuit, the 1394 physical chip 700, and the 1394 bus 810 to the audiovisual device 800B.

On the other hand, the audiovisual device 800B receives the communication command from the 1394 bus 810. In the device 800B, the command is passed via the 1394 physical chip 700, the 1394 link circuit 100, and the CPU bus 41 to the key generation & authentication unit 50. The unit 50 decodes the random number value seed and the encryption exchange key Ksx received from the audiovisual device 800A, using an authentication key Kauth kept in the unit 50 to produce an exchange key Kx as a result of the decoding. Using the exchange key Kx, there is obtained an encryption key Kcont which is equal to the encryption key used on the audiovisual device 800A side. That is, the exchange key Kx is shared between the audiovisual devices 800A and 800B.

Subsequently, audiovisual device 800A executes a key generation program recorded on the ROM 501 to generate an encryption key Kcont using the exchange key Kx and the random number value seed and then sets the encryption key Kcont to the key register 34 of the encryption circuit 300. In response thereto, the circuit 300 encrypts a digital content including an ordinary statement data contained in, for example, an MPEG2-TS packet inputted from the external device 90 of the audiovisual device 800A into encrypted statement data using the encryption key Kcont. The circuit 300 accumulates the encrypted statement data in a buffer, not shown, of the packet processing circuit 101 to configure a packet stipulated by IEEE1394. The buffer keeps the data until it is possible for the 1394 link circuit 100 to transfer data to the 1394 bus 810 to thereby serve a function of a buffer memory to absorb discrepancy between the transmission speed of the upper-layer bus 22 and that of the lower-layer bus 12.

When it is possible for the 1394 link circuit 100 to transfer data to the 1394 bus 810, a 1394 packet data containing the encrypted digital content is outputted from the lower-layer bus 12 to the 1394 physical chip 700. The chip 700 starts transmitting the digital content via the 1394 bus 810 to the communicating audiovisual device 800B. Additionally, the audiovisual device 800A sends the random number value seed as information for the decoding by the audiovisual device 800B via the 1394 bus 810 thereto. Having received the value seed, the audiovisual device 800B decodes the encrypted digital contents by the encryption circuit 300. Specifically, using the random number value seed and the exchange key Kx obtained by decoding the encryption exchange key Ksx using the authentication key Kauth, the encryption circuit 300 decodes the digital content according to a key generation algorithm in the ROM 501 of the key generation & authentication unit 50 of the audiovisual device 800B. A decoded digital content resultant from the decoding is sent via the external device 90 to be recorded in or reproduced by the recording/reproducing device 400 of the audiovisual device 800B.

In the first embodiment of the authentication communication LSI chip, data associated with program accesses to the ROM 501 appearing in the authentication and key generation processes and temporary data stored in the RAM 502 during the CPU operation in the sequence of processing are delivered to the CPU bus 41. In this connection, an authentication device and an encryption device which are configured in mutually different chips in the prior art are formed on one semiconductor chip. When compared with the directly observation of the external terminal of the encryption device, the external observation of the bus alone cannot easily identify the authentication and the key generation executed by the CPU. Therefore, it is difficult to analyze details of the processes of processing in the chip. That is, since the CPU bus 41 is used for various operations and hence passes various data items therethrough. Consequently, even if data on the CPU bus 41 is observed, it is difficult to identify the authentication and the key generation among the various operations.

Furthermore, when the authentication communication LSI chip of the embodiment is incorporated in the system (in a real system state), the CPU bus 41 is under control of the CPU 500. Therefore, in the real system state, only the CPU 500 can set data to the key register 34. That is, in the real system state, it is impossible to externally input data via the CPU bus 41 to the key register 34 for the setting thereof. This makes it difficult to modify a device on which the authentication communicating LSI chip is mounted. Additionally, since the system is configured in one chip, the system cost is minimized and the number of parts thereof is reduced to increase the mounting or packaging density of the chip.

Figure 2:
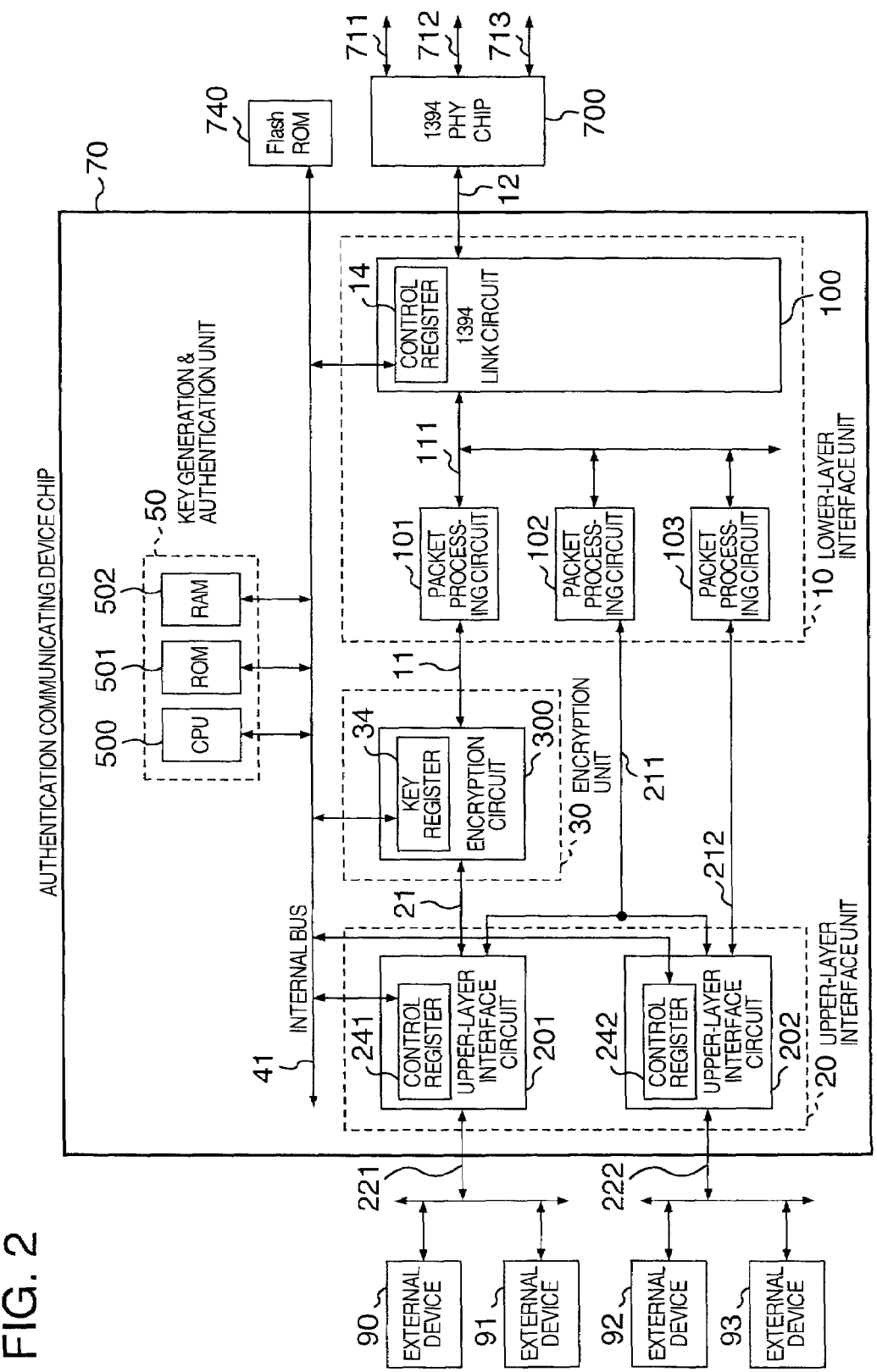
FIG. 2 is a block diagram showing second first embodiment including an authentication communicating LSI unit according to the present invention and an audiovisual apparatus including the same.

FIG. 2 shows a configuration of a second embodiment of the present invention. The second embodiment is almost the same in the configuration as the first embodiment. Three different points therebetween are as follows. First, the lower-layer interface unit 100 can process different types of packets in the second embodiment. For example, the unit includes a first packet processing circuit 101 to construct an MPEG-TS packet, a second packet processing circuit 102 to construct a digital content such as IEC61883 for which encryption is not required, and a third packet processing circuit 103 to construct a digital data packet such as the serial bus protocol 2 (SBP-2) which is being standardized according to NCITS 325-1998 of the American national Standard Institute (ANSI). In this configuration, the digital content for which encryption is not required is transmitted via transmission lines 211 and 212 directly between the packet processing circuit 102 or 103 and the upper-layer interface unit 20. Second, the upper-layer interface unit 20 includes an upper-layer interface circuit 201 which selects a packet from the encryption circuit 300 or a packet from the second packet processing circuit 102 to transmit the packet to an upper-layer bus 221 and an upper-layer interface circuit 202 which selects a packet from the second packet processing circuit 102 or a packet from the third packet processing circuit 103 to transmit the packet to an upper-layer bus 222. Third, a plurality of external devices 90 to 93 can be connected to the upper-layer interface circuits 201 and 202 at the same time. The packet processing circuits 102 and 103 are connected via a bus 111 to the 1394 link circuit 100. The packet processing circuits 102 is connected via a bus 211 to the upper-layer interface circuits 201 and 202. The packet processing circuit 103 is connected via a bus 212 to the upper-layer interface circuit 202. The other configuration, procedures of various processing, and effects of operations are substantially the same as those of the first embodiment and hence description thereof will be avoided.

Figure 3:
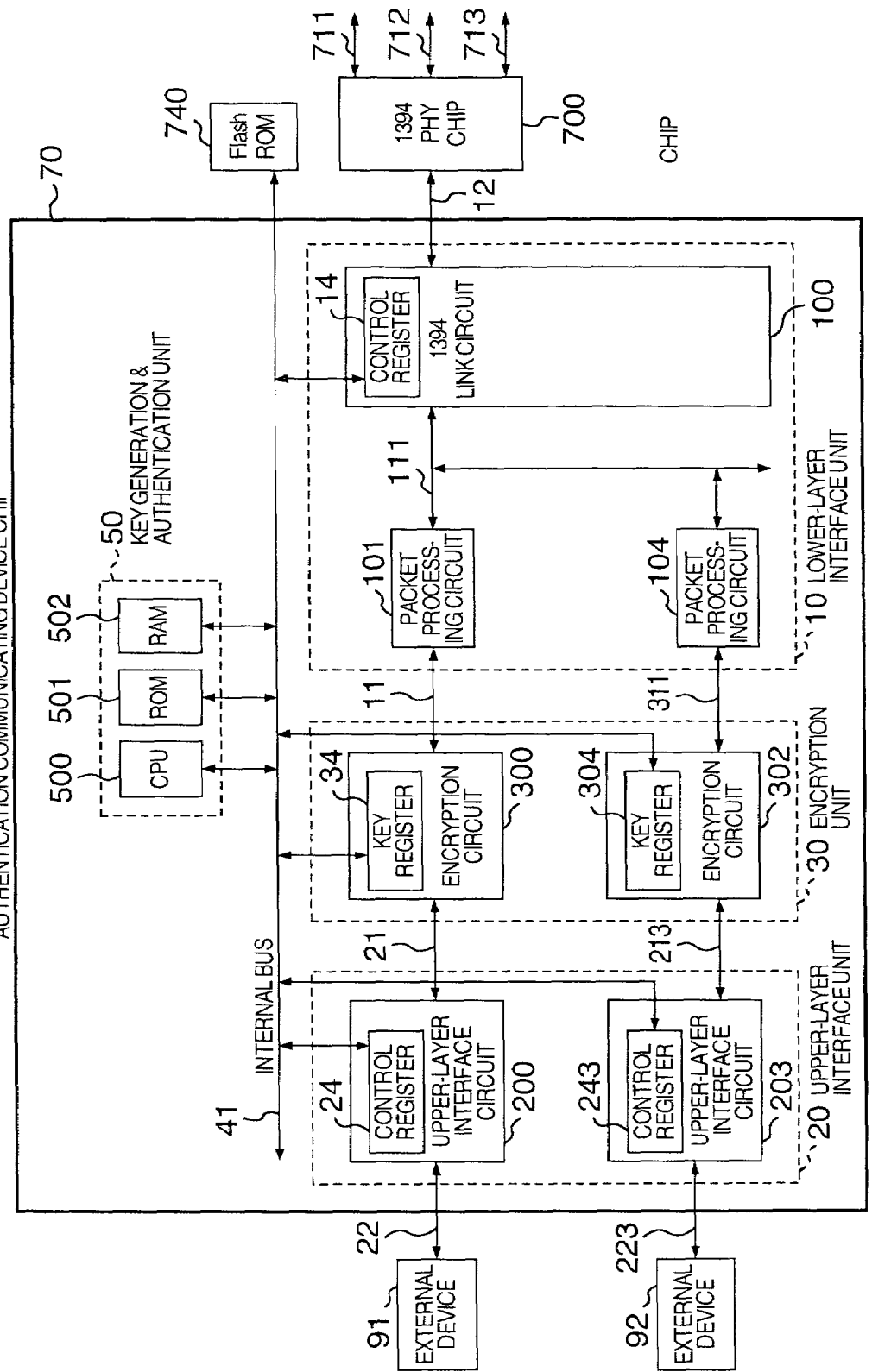
FIG. 3 is a block diagram showing a third embodiment including an authentication communicating LSI unit according to the present invention and an audiovisual apparatus including the same.

FIG. 3 shows a configuration of a third embodiment of the present invention. The third embodiment is configured almost in the same way as for the first embodiment. Two different points therebetween are as follows. First, the encryption unit 30 includes two encryption circuits 300 and 302, the lower-layer interface unit 10 includes tow packet processing circuits 101 and 104 to configure, for example, MPEG2-TS packets, and the upper-layer interface unit 20 includes first and second upper-layer interface circuits 200 and 203 respectively corresponding to the encryption processing circuits 300 and 302 so that digital contents for which encryption is required can be transferred through two channels at the same time. Second, a plurality of external devices 91 and 92 can be respectively connected to the upper-layer interface circuits 200 and 203 at the same time. The other configuration, procedures of various processing, and effects of operations are substantially the same as those of the first embodiment and hence description thereof will be avoided.

Figure 4:
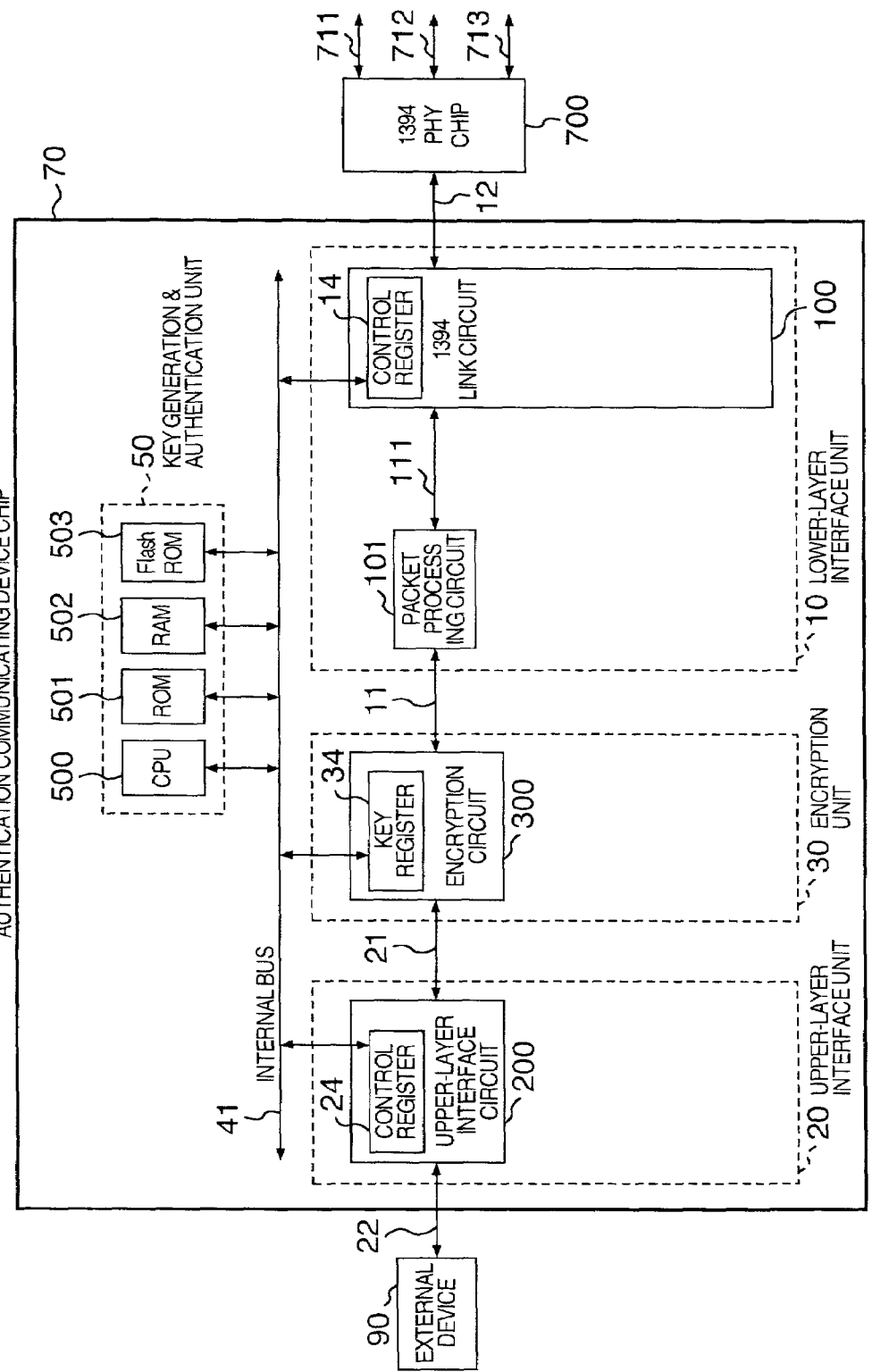
FIG. 4 is a block diagram showing fourth first embodiment including an authentication communicating LSI unit according to the present invention and an audiovisual apparatus including the same.

FIG. 4 shows a configuration of a fourth embodiment of the present invention. The fourth embodiment is implemented by disposing an internal nonvolatile memory 503 in place of the electrically rewritable nonvolatile memory 740 disposed as an external device in the first embodiment.

In each of the authentication communicating LSI chips of the first to third embodiments, the memory 740 outside the chip is connected to the internal bus 41. In the sequence of processing from the authentication to the key generation, data associated with program accesses to the ROM 501 taking place during the authentication and key generation processes and temporary data stored in the RAM 502 during the CPU operation are fed to the CPU bus 41. Therefore, the data can be externally observed. However, in the authentication communicating LSI chip 70 of the fourth embodiment, the CPU bus 41 is not connected to an external terminal of the chip 70, and hence the processes of operations cannot be externally observed. Additionally, in the real system state of the configuration, the CPU bus 41 is controlled such that only the CPU 500 can set the key register 34. Consequently, data cannot be inputted via the CPU bus 41 to the key register 34, and hence it is difficult to modify the system.

Figure 5:
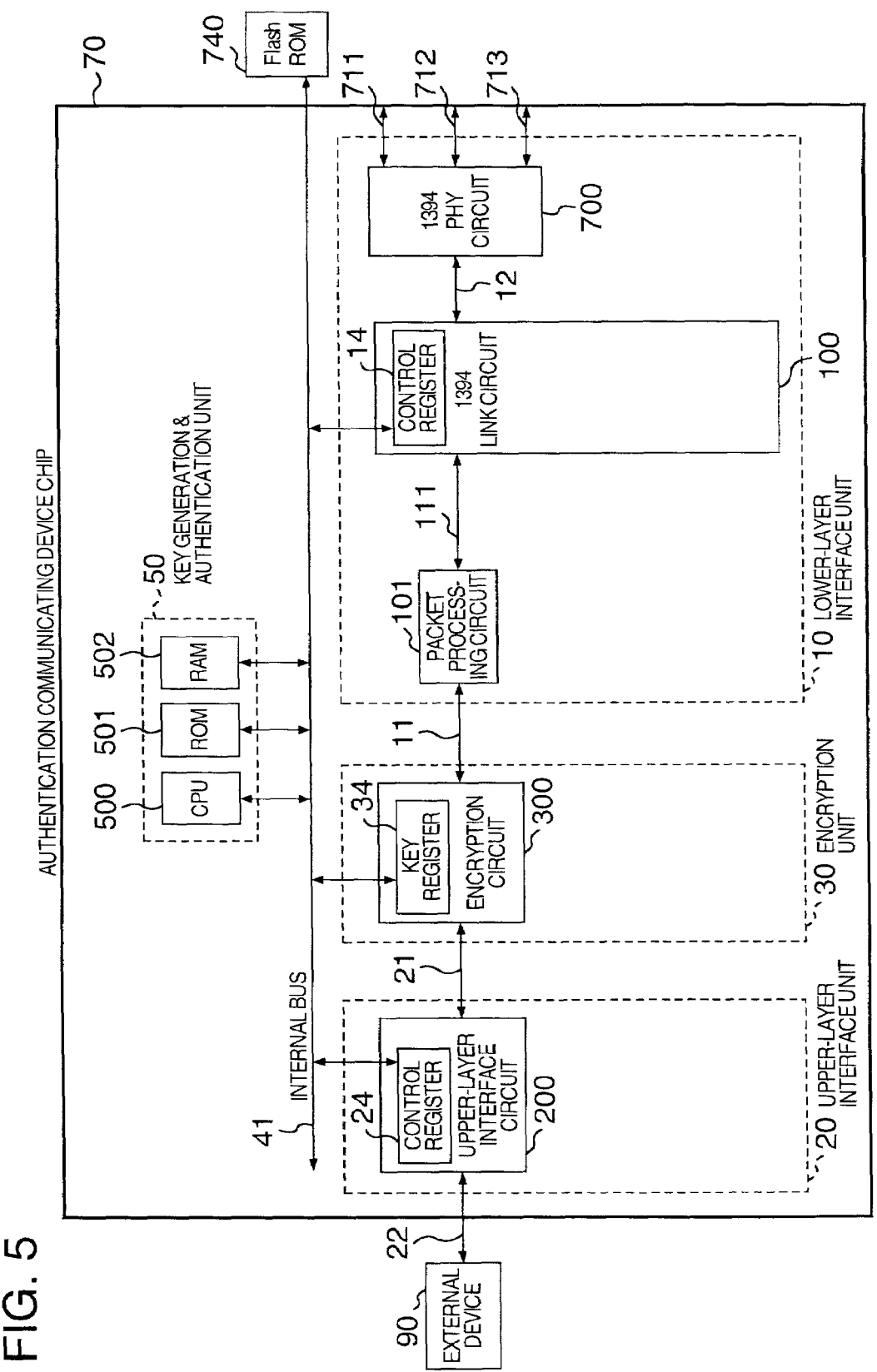
FIG. 5 is a block diagram showing a fifth embodiment including an authentication communicating LSI unit according to the present invention and an audiovisual apparatus including the same.

FIG. 5 shows a configuration of a fifth embodiment of the present invention. In the fourth embodiment, the lower-layer device 1394 physical circuit 700 disposing as an external device in the first embodiment is arranged in the authentication communicating LSI chip 70. The 1-chip configuration including the circuit 700 further enhances cost reduction and minimizes the number of parts and hence increases the packaging density.

Figure 6:
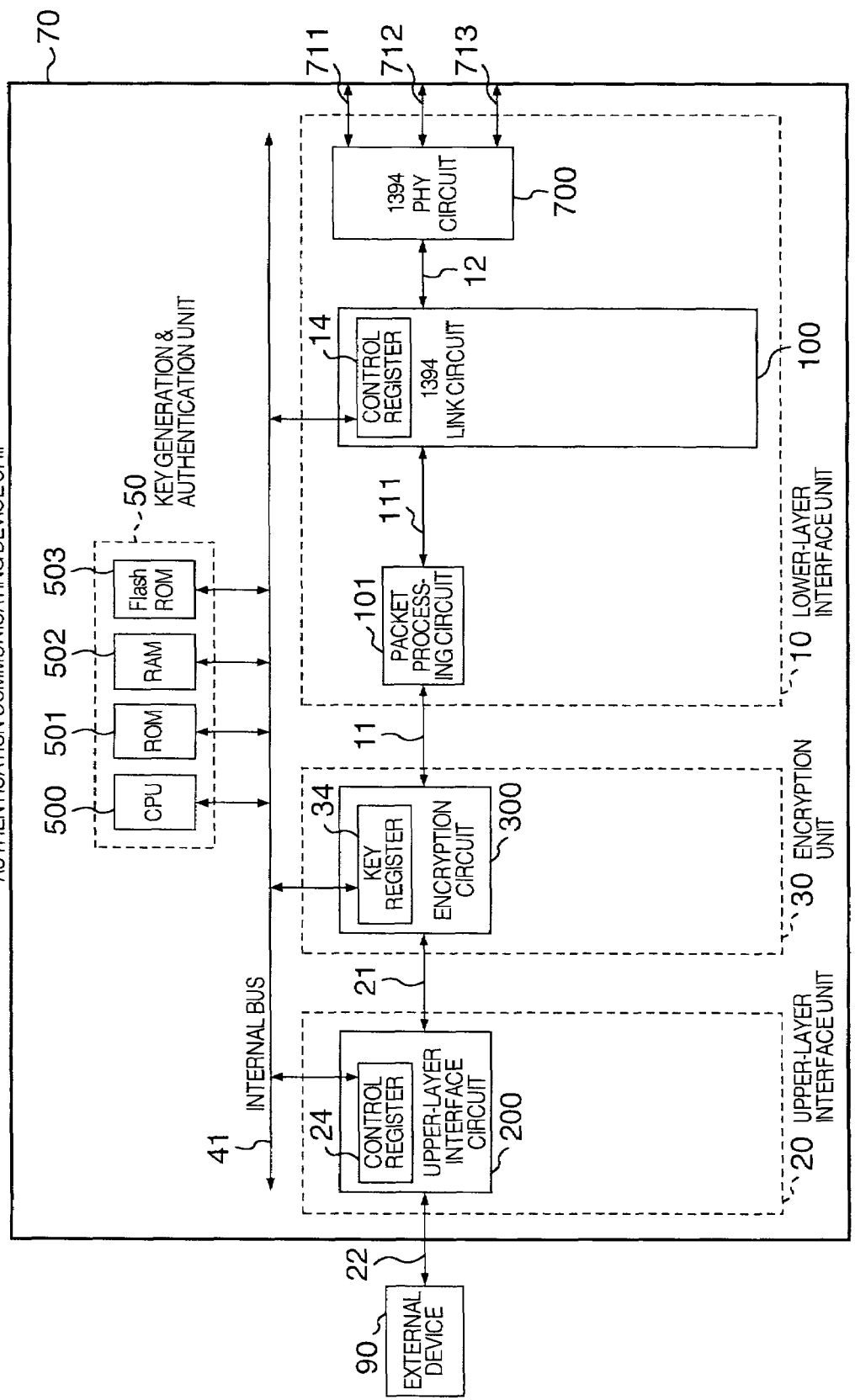
FIG. 6 is a block diagram showing sixth first embodiment including an authentication communicating LSI unit according to the present invention and an audiovisual apparatus including the same.

FIG. 6 shows a configuration of a sixth embodiment of the present invention. In the sixth embodiment, the lower-layer device 1394 physical circuit 700 disposing as an external device in the fourth embodiment is arranged in the authentication communicating LSI chip 70. According to the sixth embodiment, the advantage of the fourth embodiment and that of the fifth embodiment can be obtained.

Figure 9:
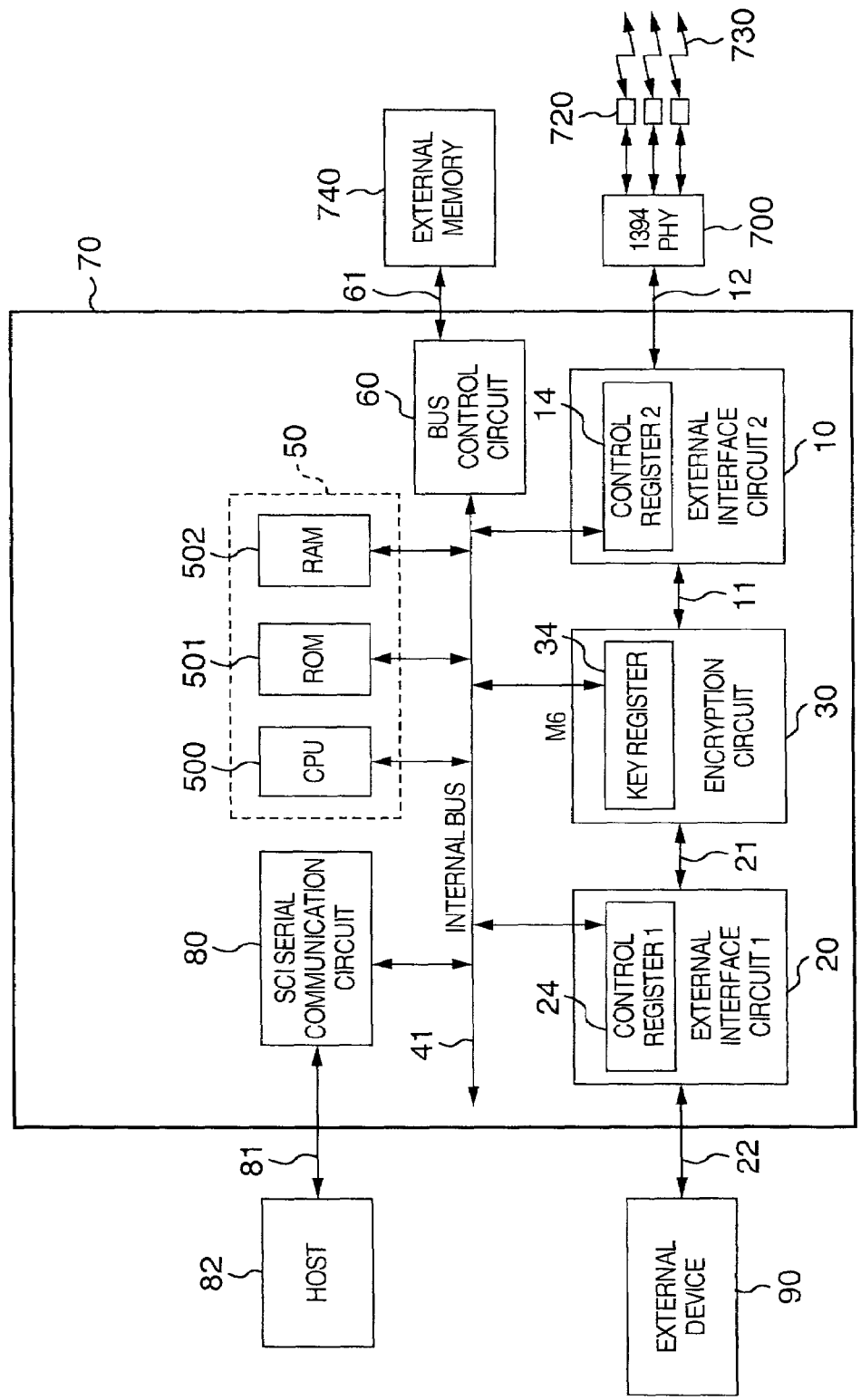
FIG. 9 is a block diagram showing a seventh embodiment including an authentication communicating LSI unit according to the present invention and an audiovisual apparatus including the same.

FIG. 9 shows another embodiment of the authentication communicating LSI chip of the 5C-DTCP specification in accordance with the present invention. This embodiment is implemented by adding to the LSI chip of the first embodiment a host CPU 82 to control the overall system, a communication circuit 80 to conduct serial communication with the host CPU 82, and a bus control circuit to control a connection change operation for the external memory 740 and the internal bus 41. As can be seen from FIG. 9, the communication circuit 80 is arranged between the internal bus 41 and the host CPU 82 and is connected via a serial communication line 81 to the host CPU 82. The external memory 740 is connected via an external bus 61 to a control circuit 60, and the CPU 500 controls the connection change operation of the bus control circuit 60 to the external memory 740 or the internal bus 41.

In the embodiment as above, the internal bus 41 is separated from the external device by the bus control circuit 60 and the communication control circuit 80. That is, in this configuration, the signal on the internal bus 41 cannot be monitored directly via an external terminal. Therefore, secrecy of data is increased and it is more difficult for the cracker to analyze the authentication algorithm and the key generation algorithm. In the embodiment, the internal CPU 500 accepts only predetermined commands from the host CPU 82. That is, data of the RAM 502 and the ROM 501 cannot be read therefrom by inputting an illegal command to the CPU 500.

FIG. 10 shows further another embodiment of the authentication communicating LSI chip in accordance with the present invention. In this embodiment, the communication circuit 80 to conduct the serial communication with the host CPU 82 in the LSI chip of the ninth embodiment is removed, and a bus control circuit 60 to control, for example, a bus connection change operation between the external memory 740 and the internal bus 41 is arranged.

FIG. 11 shows still another embodiment of the authentication communicating LSI chip in accordance with the present invention. In this embodiment, the communication circuit 80 to conduct the serial communication with the host CPU 82 in the LSI chip of the ninth embodiment is removed, and a bus control circuit 60 to control, for example, a bus connection change operation between the external memory 740 and the internal bus 41 and only the upper-layer external interface circuit 20 are disposed (the lower-layer external interface circuit 10 is not arranged).

Figure 12:
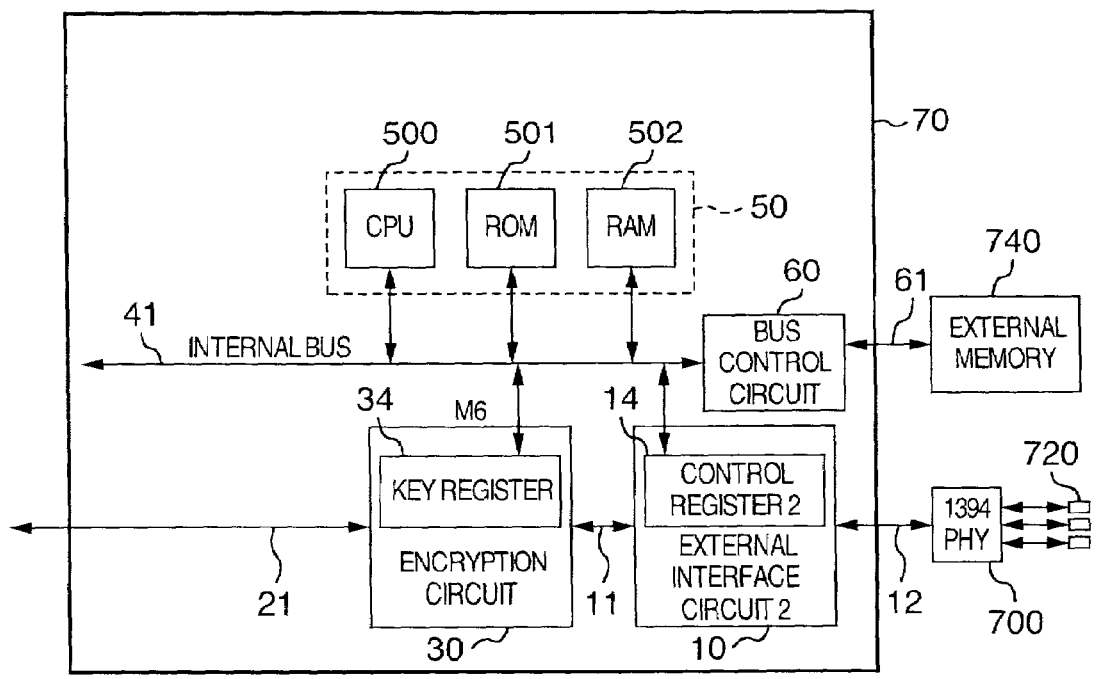
FIG. 12 is a block diagram showing a further another variation of the embodiment shown in FIG. 9.

FIG. 12 shows another embodiment of the authentication communicating LSI chip in accordance with the present invention. In this embodiment, the communication circuit 80 to conduct the serial communication with the host CPU 82 in the LSI chip of the ninth embodiment is removed, and a bus control circuit 60 to control, for example, a bus connection change operation between the external memory 740 and the internal bus 41 and only the lower-layer external interface circuit 10 are disposed (the upper-layer external interface circuit 20 is not arranged).

Also in the embodiments of FIGS. 10 to 12, the internal bus 41 is separated by the bus control circuit 60 from the external bus 61. Therefore, for the protection of the illegal copy, these embodiments have substantially the same advantages as those of the ninth embodiment of the authentication communicating LSI chip. Moreover, when the encryption 6 authentication unit 50, the encryption unit 30, and either one of the upper-layer and lower-layer external interface circuits 10 and 20 are formed on one chip, it is not possible to estimate an encryption key by directly comparing the ordinary statement data and encrypted statement data inputted to or outputted from the encryption unit 30. This consequently increases secrecy of the data.

Description has been given in detail of particular embodiments of the present invention. However, the present invention is not restricted by the embodiments. It is possible to modify and to change the embodiments in various ways within the scope of the present invention. For example, the embodiments shown in FIGS. 4 to 12 may be configured in the same fashion as for the embodiments shown in FIGS. 2 and 3. That is, a plurality of packet data items are simultaneously transferred by disposing a plurality of packet processing circuits and a plurality of upper-layer interface circuits. The description has been given of cases in which the present invention of the inventors is applied to a background field of the invention, that is, to the authentication communicating LSI chip of the 5C-DTCP specification. However, the present invention is also applicable to a communicating LSI chip of the CSS specification for the DVD video system. Furthermore, the authentication communicating LSI chip according to the present invention can be used not only in audiovisual apparatuses such as a digital video tape recorder and an integrated receiver/recorder (IRD), but also in a personal computer.

Typical features of the present invention described in the present specification lead to advantages as follows. According to the present invention, the internal signal of the semiconductor chip cannot be externally intercepted or stolen. It is difficult to externally tamper the communication command during the authentication process and the encryption key setting during the encryption process. That is, it is difficult to input a tempered data item to the system, the authentication process cannot be easily analyzed to overcome the illegal copy protection technique. Additionally, the illegal copy protection technique cannot be easily overcome by modifying the electronic device. Resultantly, it is possible to implement an electronic apparatus to communicate digital contents requiring the copyright protection with high safety.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A semiconductor integrated circuit comprising:
   a first operating unit which has a first nonvolatile memory to which a first program is stored, and a control unit generating a first key code in accordance with the first program,
   an encryption unit which has a first register and which encrypts communication data in accordance with the first key code stored in the first register;
   an interface unit which communicates in accordance with a predetermined protocol; and
   an internal bus which is coupled to the first operating unit, the encryption unit, and the interface unit,
   wherein the first nonvolatile memory, the control unit, the encryption unit, the interface unit, and the internal bus coupled to the first nonvolatile memory and the control unit are formed on a single semiconductor chip, wherein the first operation unit performs a first operation in which the control unit reads out the first program from the first nonvolatile memory, a second operation in which the control unit generates the key code in accordance with the first program, and a third operation in which the control unit sets the first key code to the first register via the internal bus, on the single semiconductor chip.

2. The semiconductor integrated circuit according to claim 1, wherein an encryption unit de-encrypts data in accordance with a key code stored in the first register.

3. A semiconductor integrated integrated circuit comprising:
a main processing unit which generates a first key code according to a predetermined algorithm, which determines approval/non-approval of an outside device, and which controls communication between the semiconductor integrated circuit and the outside device in a state of the approval;
an encryption unit which has a first register and which encrypts communication data in accordance with the first key code stored in the first register;
an interface unit which performs the communication with the outside device, in accordance with a predetermined protocol and the approval; and
an internal bus which is coupled to the main processing unit, the encryption unit and the interface unit;
wherein the main processing unit, the encryption unit, the interface unit and the internal bus are formed on a single semiconductor chip,
wherein the main processing unit sets the first key code to the first register via the internal bus.

4. A semiconductor integrated circuit according to claim 3, further comprising:
a first nonvolatile memory to which a first program for generating the first key code and for determining the approval/non-approval of the outside device is stored; and
a volatile memory which is as a work area for the main processing unit,
wherein the internal bus is coupled to the first nonvolatile memory and the volatile memory.

5. A semiconductor integrated circuit according to claim 4, further comprising;
a second nonvolatile memory to which a communication control program and a unique information related to a device is stored,
wherein the interface unit which has a second register to which a second key code for determining the approval/non-approval of the outside device is stored,
wherein the main processing unit generates the second key code in accordance with the first program,
wherein the main processing unit controls the communication between the semiconductor integrated circuit and the outside device in the state of the approval, in accordance with the communication control program, and
wherein the internal bus is coupled to the second nonvolatile memory.

6. A semiconductor integrated circuit according to claim 4, further comprising a bus control circuit which controls the internal bus,
wherein the bus control circuit is between the internal bus and an outside of the semiconductor integrated circuit.

7. An electric device comprising:
a semiconductor integrated circuit which includes;
a main processing unit which generates a first key code according to a predetermined algorithm, which determines approval/non-approval of an outside device, and which controls communication between the semiconductor integrated circuit and the outside device in a state of the approval;
an encryption unit which has a first register and which encrypts communication data in accordance with the first key code stored in the first register;
a first interface unit which performs the communication with the outside device, in accordance with a predetermined protocol and the approval;
a second interface unit;
a communication circuit; and
an internal bus which is coupled to the main processing unit, the encryption unit, the second interface unit, the communication circuit and the first interface unit;
a host unit which controls the electric device and communicates to the communication circuit; and
an external device coupled to the second interface unit,
wherein the main processing unit; the encryption unit, the first interface unit, the second interface unit, the communication circuit and the internal bus are formed on a single semiconductor chip, and
wherein the main processing unit sets the first key code to the first register via the internal bus.

8. The electric device according to claim 7, further comprising:
an external memory,
wherein the semiconductor integrated circuit has a bus control unit coupled to the internal bus, and
wherein the bus control unit coupled to the external memory controls the internal bus.

9. The electric device according to the claim 7, further comprising:
a first nonvolatile memory to which a first program for generating the first key code and for determining the approval/non-approval of the outside device is stored; and
a volatile memory which as a work area for the main processing unit,
wherein the internal bus is coupled to the first nonvolatile memory and the volatile memory.

10. The electric device according to claim 7, further comprising:
a second nonvolatile memory to which a communication control program and an unique information of the electric device is stored,
wherein the interface unit which has a second register to which a second key code for determining the approval/non-approval of the outside device is stored, and the main processing unit generates the second key code in accordance with the first program, wherein the main processing unit controls the communication between the semiconductor integrated circuit and the outside device in the state of the approval, in accordance with the communication control program, and
wherein the internal bus is coupled to the second nonvolatile memory.

11. The electric device according to claim 7, further comprising an encryption unit that de-encrypts data in accordance with a key code stored in the first register.

* * * * *